(12) United States Patent
Tai et al.

(10) Patent No.: US 8,918,526 B2
(45) Date of Patent: Dec. 23, 2014

(54) APPLICATION SERVICE INVOCATION BASED ON FILTER CRITERIA

(75) Inventors: Yung-Hwa Tai, Holmdel, NJ (US); Gregory Welch, Somerset, NJ (US); James L. Verlare, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 725 days.

(21) Appl. No.: 13/189,625

(22) Filed: Jul. 25, 2011

(65) Prior Publication Data

US 2012/0020350 A1    Jan. 26, 2012

Related U.S. Application Data

(63) Continuation of application No. 11/612,681, filed on Dec. 19, 2006, now Pat. No. 8,234,388, which is a continuation-in-part of application No. 11/460,750, filed on Jul. 28, 2006.

(60) Provisional application No. 60/764,748, filed on Feb. 3, 2006, provisional application No. 60/703,812, filed on Jul. 29, 2005.

(51) Int. Cl.

| | |
|---|---|
| *G06F 15/16* | (2006.01) |
| *H04L 29/06* | (2006.01) |
| *H04Q 3/00* | (2006.01) |
| *H04M 7/12* | (2006.01) |
| *H04L 29/08* | (2006.01) |

(52) U.S. Cl.
CPC ............ *H04L 67/16* (2013.01); *H04L 65/4007* (2013.01); *H04L 65/1016* (2013.01); *H04Q 3/0045* (2013.01); *H04M 7/128* (2013.01); *H04Q 3/0025* (2013.01)

USPC ........ 709/229; 709/224; 709/227; 379/88.13; 379/88.17

(58) Field of Classification Search
USPC ................. 379/88.13, 88.17, 201.02, 265.09; 709/224, 227
See application file for complete search history.

(56) References Cited

U.S. PATENT DOCUMENTS

| | | | |
|---|---|---|---|
| 5,689,553 | A | 11/1997 | Ahuja et al. |
| 6,578,076 | B1 | 6/2003 | Putzolu |

(Continued)

FOREIGN PATENT DOCUMENTS

| | | |
|---|---|---|
| WO | 01/74108 | 10/2001 |
| WO | 01/78328 | 10/2001 |
| WO | 2004/008786 | 1/2004 |

OTHER PUBLICATIONS

"3rd Generation Partnership Project; Technical Specification Group Services and System Aspects; Internet Protocol (IP) Based IP Multimedia Subsystem (IMS) Emergency Sessions; (Release 7)," 3GPP TR 23.867 V1.0.0, pp. 1-82, May 2005.

(Continued)

*Primary Examiner* — Duc Nguyen
*Assistant Examiner* — Yosef K Laekemariam

(57) ABSTRACT

An Internet Protocol Multimedia Subsystem (IMS) device includes a memory configured to store a subscriber profile, where the subscriber profile includes at least one criterion relating to an event that occurs after a session request has been forwarded to a terminating party. The IMS device further includes a processor configured to invoke at least one application service for a session based on the at least one criterion in the subscriber profile.

20 Claims, 12 Drawing Sheets

(56) References Cited

U.S. PATENT DOCUMENTS

| | | |
|---|---|---|
| 6,701,160 B1 | 3/2004 | Pinder et al. |
| 7,079,627 B2 | 7/2006 | Crago et al. |
| 7,155,248 B2 | 12/2006 | Idnani |
| 7,209,458 B2 | 4/2007 | Ahvonen et al. |
| 7,606,902 B2 | 10/2009 | Rao et al. |
| 2003/0027569 A1 | 2/2003 | Ejzak |
| 2003/0046396 A1 | 3/2003 | Richter et al. |
| 2004/0068574 A1 | 4/2004 | Costa Requena et al. |
| 2004/0148416 A1 | 7/2004 | Aamos et al. |
| 2004/0190498 A1 | 9/2004 | Kallio et al. |
| 2005/0014483 A1* | 1/2005 | Lagerstrom .................. 455/405 |
| 2005/0050194 A1 | 3/2005 | Hoeneisen et al. |
| 2005/0064883 A1 | 3/2005 | Heck et al. |
| 2005/0177616 A1 | 8/2005 | Addington et al. |
| 2005/0213606 A1 | 9/2005 | Huang et al. |
| 2006/0104431 A1 | 5/2006 | Emery et al. |
| 2006/0206504 A1 | 9/2006 | Cai et al. |
| 2006/0253538 A1* | 11/2006 | Jung et al. ..................... 709/206 |
| 2006/0270404 A1 | 11/2006 | Tuohino et al. |
| 2007/0201452 A1 | 8/2007 | Berna Fornies et al. |

OTHER PUBLICATIONS

"Digital Cellular Telecommunications System (Phase 2+); Universal Mobile Telecommunications System (UMTS); IP Multimedia Subsystem (IMS); Stage 2 (3GPP TS 23.228 Version 6.10.0 Release 6); ETSI TS 123 228," pp. 1-182, Jun. 2005.

* cited by examiner

| PUBLIC USER ID 710 | PRIORITY 720 | TRIGGER POINT 730 | APPLICATION SERVER 740 |
|---|---|---|---|
| ID #1 | PRIORITY INDICATION | TRIGGER POINT | APPLICATION SERVER |
| ID #2 | PRIORITY INDICATION | TRIGGER POINT | APPLICATION SERVER |
| ID #3 | PRIORITY INDICATION | TRIGGER POINT | APPLICATION SERVER |
| ID #4 | PRIORITY INDICATION | TRIGGER POINT | APPLICATION SERVER |
| ... | ... | ... | ... |
| ID #N | PRIORITY INDICATION | TRIGGER POINT | APPLICATION SERVER |

FIG. 7

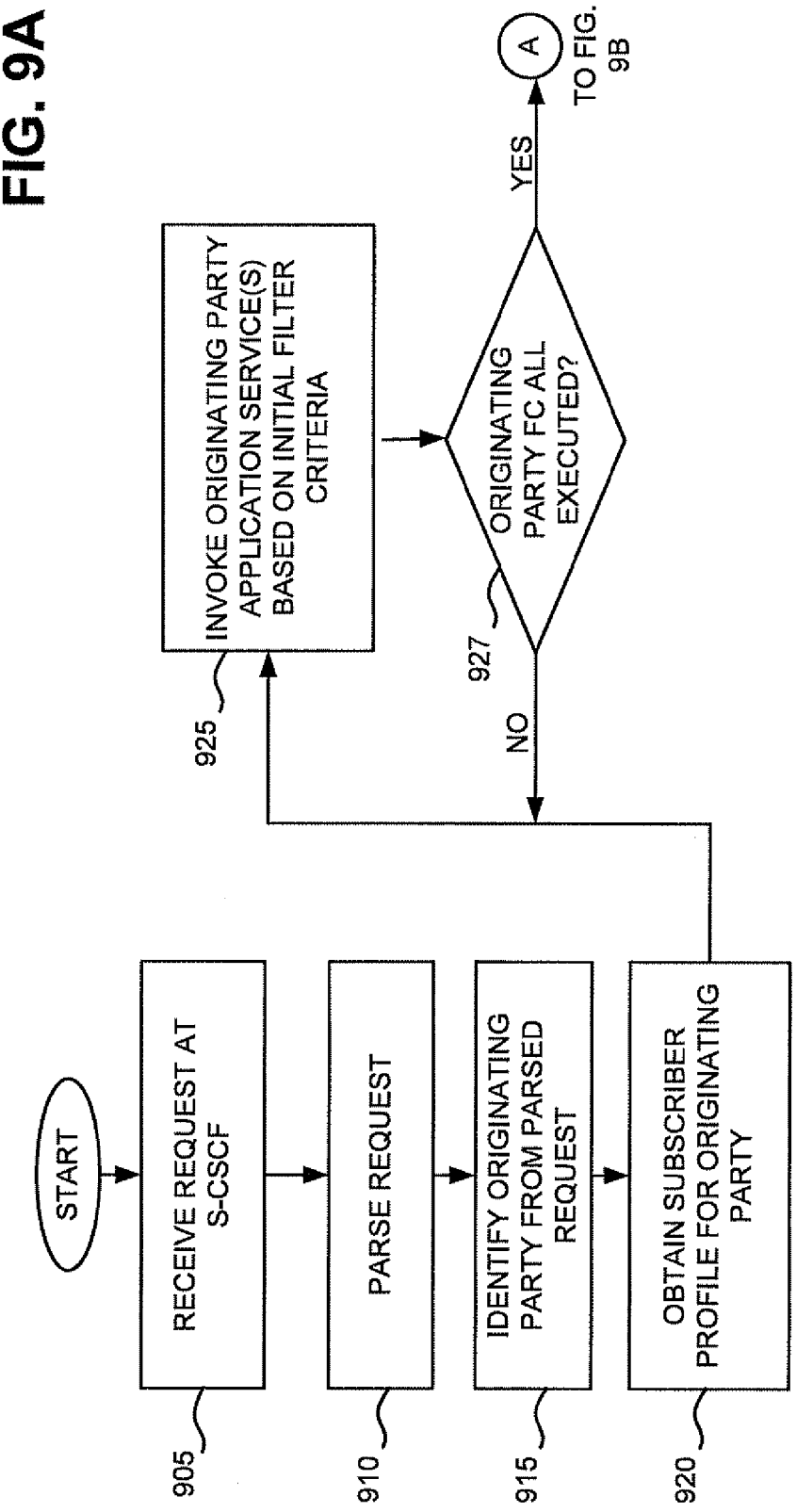

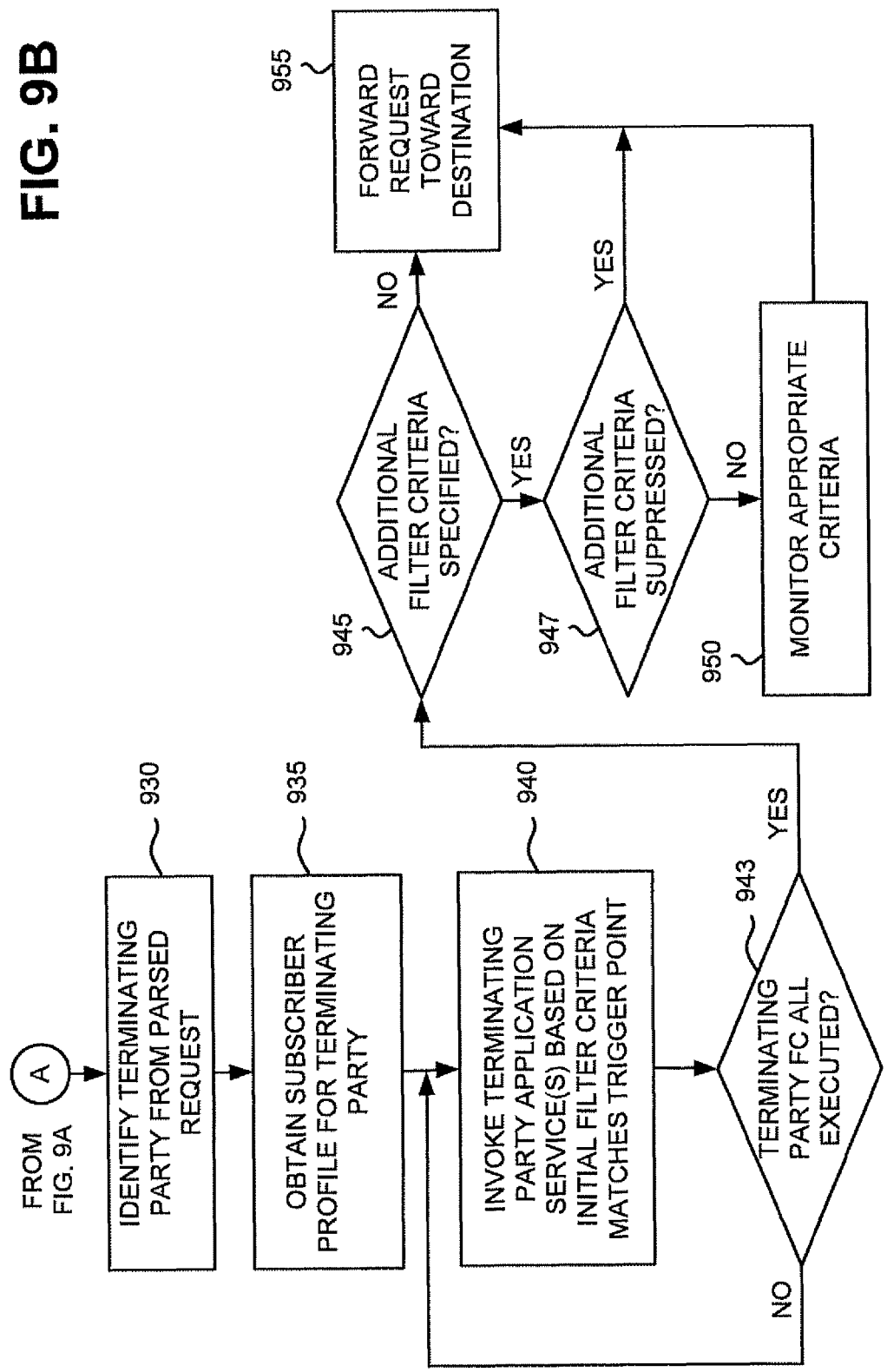

APPLICATION SERVICE INVOCATION BASED ON FILTER CRITERIA

PRIORITY INFORMATION

The present application is a Continuation of U.S. patent application Ser. No. 11/612,681, filed Dec. 19, 2006 now U.S. Pat. No. 8,234,388, which is a Continuation-in-Part of U.S. patent application Ser. No. 11/460,750, filed Jul. 28, 2006, which claims priority to U.S. Provisional Patent Application No. 60/703,812, filed Jul. 29, 2005, and U.S. Provisional Patent Application No. 60/764,748, filed Feb. 3, 2006. The contents of all of these applications are incorporated herein by reference in their entireties.

BACKGROUND INFORMATION

The Internet Protocol Multimedia Subsystem (IMS) provides mobile and fixed multimedia services. The aim of IMS is not only to provide new services, but also all of the services, current and future, that the Internet provides. In this way, IMS gives network operators and service providers the ability to control and charge for each service. In addition, users are given the ability to execute services from their home networks, as well as when the users are roaming.

BRIEF DESCRIPTION OF THE DRAWINGS

FIG. 7 illustrates an exemplary database that may be associated with an application server of FIG. 1;

FIGS. 9A and 9B illustrate an exemplary flow chart for processing a request in an exemplary implementation;

DETAILED DESCRIPTION OF PREFERRED EMBODIMENTS

The following detailed description of implementations consistent with principles of the invention refers to the accompanying drawings. The same reference numbers in different drawings may identify the same or similar elements. Also, the following detailed description does not limit the invention.

Implementations described herein relate to providing filter criteria for invoking application services in an IMS.

Figure 1:
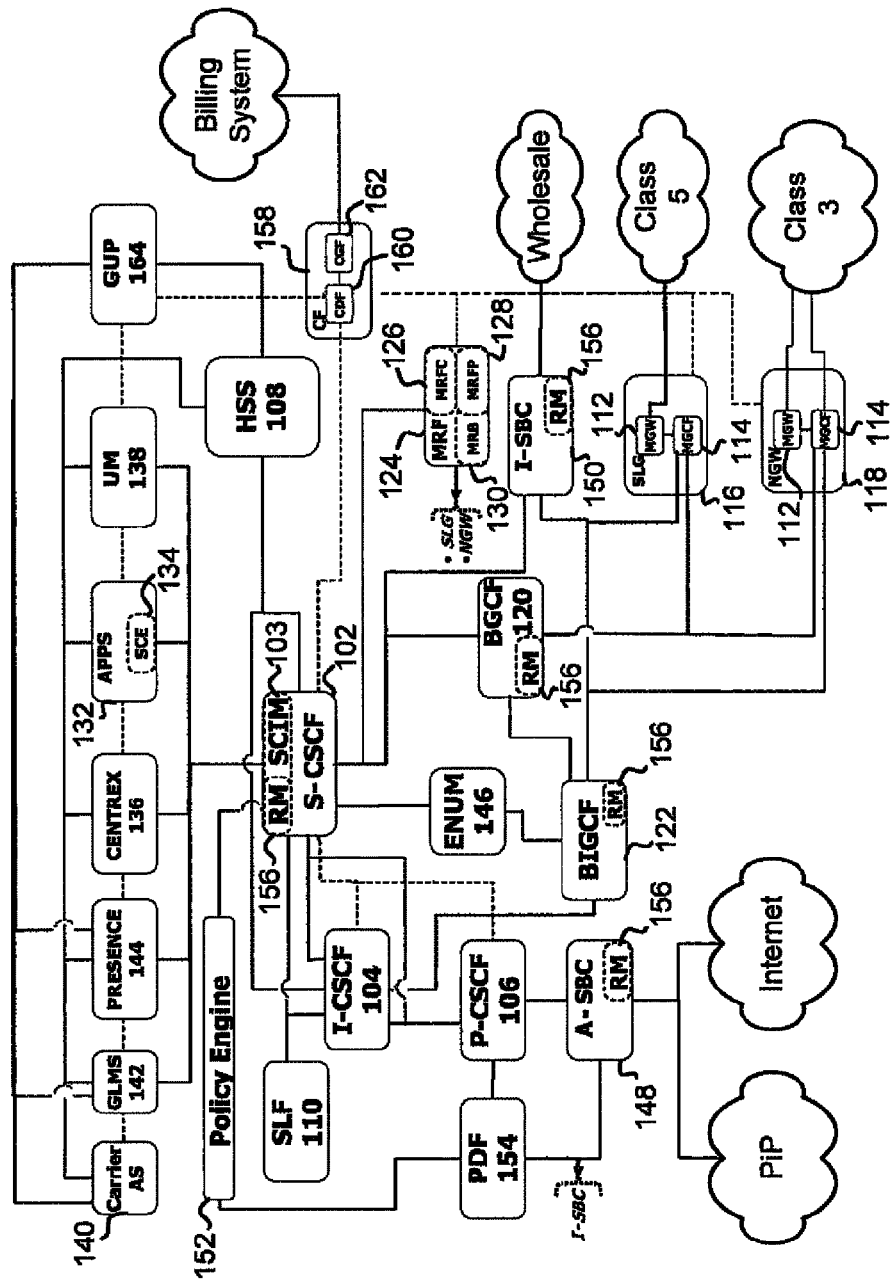
FIG. 1 illustrates an exemplary system in which systems and methods, consistent with exemplary embodiments, may be implemented.

FIG. 1 illustrates an exemplary system 100 in which systems and methods, consistent with exemplary embodiments, may be implemented. As illustrated, system 100 may include a S-CSCF 102, a Service Capability Interaction Manager (SCIM) 103, an Interrogating-Call Session Control Function (I-CSCF) 104, a Proxy-Call Session Control Function (P-CSCF) 106, a Home Subscriber Server (HSS) 108, a Subscription Location Function (SLF) 110, two Media Gateway (MGW) functions 112, two Media Gateway Control Functions (MGCFs) 114, a Shared Local Gateway (SLG) 116, a Network Gateway (NGW) 118, a Breakout Gateway Control Function (BGCF) 120, a Break In Gateway Control Function (BIGCF) 122, a Multimedia Resource Function (MRF) 124 that may include a Multimedia Resource Function Controller (MRFC) 126, a Multimedia Resource Function Processor (MRFP) 128, and a Media Resource Broker (MRB) 130, one or more application servers 132, Services Creation Environment (SCE) logic 134, a Central Office Exchange Service (CENTREX) 136, a Unified Messaging service (UM) 138, a carrier Application Service (AS) 140, a Group List Management Server (GLMS) 142, a presence service 144, a telephone number mapping (ENUM) server 146, an Access-Session Border Controller (A-SBC) 148, an Interconnection-Session Border Controller (I-SBC) 150, a policy engine 152, a Policy Decision Function (PDF) 154, a Resource Management function (RM) 156, a Charging Function (CF) 158, a Charging Data Function (CDF) 160, a Charging Gateway Function (CGF) 162, and a Generic User Profile (GUP) 164. Although not specifically depicted in FIG. 1, the IMS core may include, for example, S-CSCF 102, I-CSCF 104, P-CSCF 106, and HSS 108. The number of components illustrated in FIG. 1 is provided for simplicity. In practice, a typical system could include more or fewer components than illustrated in FIG. 1. Moreover, it will be appreciated that the IMS standards are continually evolving. Implementations described herein are equally applicable to current and future IMS standards.

S-CSCF 102, I-CSCF 104, and P-CSCF 106 may be considered call session control components in system 100. The call session control components may be responsible for parsing a session (e.g., a session initiation protocol (SIP) session) and applying logic (e.g., business logic, service logic, operational logic, etc.) on a per event basis. The outcome of the session control may be to route an event to the appropriate components and/or append SIP headers and values.

S-CSCF 102 may be viewed as the brains of the IMS core. S-CSCF 102 may perform session control, registration, and service invocation for the subscribers of the IMS core. Hence, S-CSCF 102 may be viewed as the run-time engine, deciding to whom and under what conditions specific services (in the form of Application Servers) are accessed by a SIP request. S-CSCF 102 may receive subscriber profiles from HSS 108 (at registration time or later for unregistered users) to learn the subscribers chosen services and the rules under which the services should be brokered. Additionally, S-CSCF 102 may perform user authentication based on information from HSS 108. S-CSCF 102 may receive session requests from, for example, P-CSCF 106 or I-CSCF 104. After service invocation is completed, S-CSCF 102 may disposition the sessions by routing the session requests to the destinations via, for example, P-CSCF 106, BGCF 120, and/or I-SBC 150.

As illustrated, S-CSCF 102 may include SCIM 103 and Resource Management (RM) function 156. SCIM 103 may be considered an extension of S-CSCF 102, and may be responsible for orchestrating the offerings of one or more application services across various service enabling technologies and platforms to produce valued services for IMS users. As such, SCIM 103 may be viewed as an adjunct IMS platform function that orchestrates service invocation at session setup, modification, or teardown. Accordingly, SCM 103 may also be based on a subscriber's profile and predefined interaction rules to determine which services are to be invoked at run time and what type of application and/or media capabilities should be engaged in order to properly execute the services. SCIM 103 may allow for more complex rules to be used for services determination based on the subscriber's profile and, for example, on external information, such as policy information, location information, presence information, the readiness condition of an application server (e.g., load balancing information, network outage information, application server status information, resource availability information, etc.), etc. Additional information regarding S-CSCF 102 and SCIM 103 may be found in U.S. patent application Ser. No. 11/564,984, filed Nov. 30, 2006 and entitled "APPLICATION SERVICE INVOCATION," the entire contents of which are incorporated by reference herein.

RM 156, as will be discussed in further detail below, may be responsible for executing business rules and service level agreements (SLAs) by allocating the appropriate resources.

I-CSCF 104 may act as the main point of contact for connections to and from a subscriber in the IMS platform. I-CSCF 104 may be located at the edge of the IMS core. I-CSCF 104 may receive SIP messages and identify the next hops for the SIP messages. To achieve this, I-CSCF 104 may query HSS 108 for the location (e.g., an address) of the appropriate S-CSCF to which a particular SIP message is to be forwarded.

P-CSCF 106 may receive session requests from end points located at both public IP networks and private IP networks. P-CSCF 106 may validate requests, forward the requests to selected destinations, and process and forward the responses. P-CSCF 106 may generate chargeable events and send information relating to the chargeable events to CF 158. Additionally, P-CSCF 106 may interact with PDF 154 to grant, reject, or downgrade a session request based on platform resources and quality of service (QoS) measurements.

HSS 108 may include one or more servers that act as the central repository for user-related information. HSS 108 may contain user-related subscription information for handling multimedia sessions. Some of the information contained in HSS 108 may include information identifying the location of a particular S-CSCF 102 for a particular user. As indicated above, the location of a particular S-CSCF 102 may be conveyed to I-CSCF 104 upon receiving a query from a network element. HSS 108 may also include subscriber profile information that contains, in one exemplary implementation, extended filter criteria service trigger points and information identifying the corresponding resources (e.g., applications, media, services, etc.) that offer the services. The subscriber profile information may be forwarded to S-CSCF 102 for session control and service treatment. Moreover, HSS 108 may provide and receive updates directly from application servers 132.

SLF 110 may include one or more databases that contain subscription location information for subscribers. SLF 110 may receive a query, which may contain identification information for a subscriber, from I-CSCF 104 and may return, based on the subscriber identification information, information identifying an HSS (e.g., HSS 108) that serves the subscriber.

System 100 may include various components that bridge the IMS core to external networks, such as a public switched telephone network (PSTN), the Internet, etc. These components, which may include MGW function 112, MGCF 114, SLG 116, NGW 118, BGCF 120, and BIGCF 122, may perform protocol conversion and event routing to or from the IMS core. In one exemplary implementation, SLG 116 and NGW 118 may be replaced with more generic gateways that include MGW 112 and MGCF 114.

MGW function 112 may connect PSTN networks and the IMS core. In one implementation, MGW function 112 may terminate bearer channels from a PSTN network and media streams from the IMS core (e.g., real-time transport protocol (RTP) streams in an IP network or Asynchronous Transfer Mode (ATM) Adaptation Layer 2 (AAL2)/ATM connections in an ATM backbone), may execute the conversion between these terminations, and may perform transcoding and signal processing. In addition, MGW function 112 may provide tones and announcements to circuit switched (CS) users. In one exemplary implementation, MGW function 112 may operate under the control of MGCF 114.

MGCF 114 may be part of the gateway infrastructure that enables communication between the IMS core and PSTN networks. MGCF 114 may contain signaling gateway functions that perform protocol conversion between the Integrated Services Digital Network (ISDN) User Part (ISUP) or Primary Rate Interface (PRI) and SIP protocols before forwarding a session to the MS core. In a similar fashion, IMS-originated sessions directed towards PSTN users may traverse MGCF 114. MGCF 114 may use media gateway control protocols control media channels in MGW 112. In addition, MGCF 114 may report account information to CF 158.

SLG 116 may include a set of MGCF 114 and MGW 112 entities. SLG 116 may connect the IMS core to Class 5 networks. In one implementation, the interfaces between SLG 116 and the Class 5 networks may include Digital Signal 1 (DS1)-based Non-Facilities Associated Signaling (NFAS) PRIs.

NGW 118 may include a set of MGCF 114 and MGW 112 entities. NGW 118 may connect the MS core to Class 3 networks. In one implementation, the interfaces between MGCF 114 of NGW 118 and the Class 3 networks may include DS1-based signaling system 7 (SS7) interfaces and the interfaces between MGW 112 of NGW 118 and Class 3 networks may include DS1-bearer channels.

BGCF 120 may connect IMS-initiated calls to Circuit Switch (CS) customers (e.g., an IMS subscriber calling a telephone number in the PSTN). BGCF 120 may, based on a routing policy, select an appropriate network in which the connection is to be made or may select the appropriate gateway to the other network.

BIGCF 122 may correspond to an ingress point that handles incoming calls from PSTN gateways (e.g., NGW 118, SLG 116), wholesale gateways, other IP-based carriers (e.g., based on Voice over Internet Protocol (VoIP) peering agreements), Emergency Services Peering Points, etc. BIGCF 122 may route calls from and to non-IMS subscribers. BIGCF 122 may route calls to the IMS core, when the calls are destined for IMS subscribers or when IMS applications are invoked, or may bypass the IMS core elements (P-CSCF 106, I-CSCF 104, S-CSCF 102, HSS 108, etc.) when calls are destined for non-IMS subscribers and no IMS applications are invoked by the calling party or called party. BIGCF 122 may route calls to PSTN-based termination points to BGCF 120 and route calls to IP-based termination points (e.g., a wholesale termination point IP-based carriers, etc.) directly to I-SBCs 150 associated with the IP-based termination points. If calls are either from and/or to IMS subscribers or IMS applications (or services) are invoked, BIGCF 122 may route the calls to the IMS core via I-CSCF 104 and using S-CSCF 102 to invoke calling and/or called party features.

The IMS core may provide multimedia services. Examples of multimedia services (or applications) include playing announcements, audio/video recording and playback, interactive voice response (IVR), fax reception and transmission, automatic speech recognition (ASR), text-to-speech conversion (TTS), multimedia conferencing, customized ring back tones, push-to-talk over cellular (PoC), video messaging, etc. MRF 124 may be part of the IMS core and may support services that use multimedia streams.

As illustrated in FIG. 1, MRF 124 may include MRFC 126, MRFP 128, and MRB 130. MRFC 126 and MRFP 128 are the IMS resources that provide support for bearer-related services (e.g., multi-party sessions, announcements to a user, bearer transcoding, etc.). MRFC 126 may provide bearer control-related services. MRFP 128 may provide user plane resources that may be requested and instructed by MRFC 126. MRB 130 may provide a resource management function that is able to allow media resources to become common resources shared among multiple applications.

Application servers 132 may include one or more servers that provide enhanced audio, video, messaging, and data services within the application layer of system 100. Application servers 132 may be accessible to the users of the IMS core and provide value-added multimedia services to those users. Application servers 132 may submit charges to the IMS core for the services that application servers 132 provide to the IMS user community.

Two types of application servers that may be used within system 100 may include macro applications (or macro application services) and micro applications (or micro application services). Macro applications may include standalone application servers that typically contain support functions (e.g., registration, media resource, etc.).

Each of the macro applications may correspond directly to a service and a trigger in a subscriber's profile. S-CSCF 102 may detect the trigger point of a macro application and invoke the macro application via the S-CSCF/SCIM functionality. S-CSCF 102/SCIM 103 may manage interactions among the intact macro applications and the composite services constituted by multiple micro applications (described in the following paragraph)—or a combination of one-to-many macro and one-to-many micro applications.

Examples of macro application services may include Hosted IP CENTREX (HIPC) 136, Unified Messaging (UM) 138, GLMS 142, and Presence service 144. CENTREX 136 may correspond to a type of Private Branch Exchange (PBX) service in which switching occurs at a local telephone office instead of at the company premises where the traditional PBX is located—may be referred to as Customer Premise Equipment (CPE). In one implementation, CENTREX 136 may be replaced by or supplemented with a SIP Voice Features server. Unified messaging 138 may allow users to retrieve and send voice messages from a single interface, regardless of the technology (e.g., telephone, personal computer, etc.) and may provide other unified messaging services (e.g., fax deposit retrieval, voice to email, etc.).

Micro applications may be provided on one or more Services Creation Environment (SCE) with service execution capability formulating SIP Application Servers. Micro applications may include a wide variety of enhanced multimedia services that allow for a rapid development and deployment cycle. Multiple micro applications may be assembled into a composite service. This composite service, in the same manner as the macro applications, may be represented by a trigger in a subscriber's profile. S-CSCF 102 may detect the trigger point of a composite service and invoke the composite service via SCIM 103 functionality.

SCIM 103 may also play a role in managing interactions among the micro applications when such a composite service is invoked. SCIM 103 may apply the following processes in managing the interactions among micro applications: sequences the micro applications invocation based on predefined priority; detects mid-call triggers and determines the subsequent micro application invocation accordingly; resolves service conflicts based on the predefined interaction rules; and/or applies default handling in exception cases. These processes may be similar to what S-CSCF 102 applies on macro applications. However, micro applications have a stronger disproportionate reliance on the richer SCIM functionality, in comparison to macro services. For example, if a Location Service is blended with a CENTREX service, most of the session control may reside within the CENTREX service. Comparatively, if micro applications, such as Find-Me, Do-Not-Disturb, voicemail, and Location services (all as micro services) are blended, then there may be a disproportionately higher reliance on session control from SCM 103. That is, SCIM 103 may be used to handle mid-call triggers, fully manage exception cases, etc. Accordingly, the need for robust orchestration may be significantly higher in an environment where there is significant service decomposition (micro services).

One example of a micro application is Carrier AS 140, which may facilitate feature rich toll free call processing. Other examples of micro applications may include, as indicated above, a Find-Me service, a Do-Not-Disturb service, a voicemail service, a location service, etc.

SCE 134 may provide a foundation for rapid development of next generation services. SCE 134 may support Java Specification Request (JSR) 116 SIP Servlet and a suite of externalized application programming interfaces (APIs) for developers to gain access to the IMS core. A single SCE 134 may support a number of macro application servers and may contain basic service capabilities support the building of micro applications.

The IMS core may support a number of different services, such as GLMS 142, Presence service 144, and ENUM server 146. GLMS 142 may include one or more services that allow for group list creation, management, and use across multiple applications within the IMS core. GLMS 142 may enforce access and visibility rules. Presence service 144 may include one or more services that automate the task of aggregating both presence and availability information. Presence service 144 may inform one user about the status of another user's availability and willingness to communicate. Presence service 144 may use a Presence User Agent (PUA) to manage the presence of the IMS subscribers and handle presence subscription requests. For example, an application or an IMS subscriber may act as a watcher, which is an entity that subscribes to presence information provided by Presence service 144. ENUM server 146 may provide translation of E.164 to SIP URIs. BIGCF 122 and S-CSCF 102 may query ENUM server 146 to determine a next hop for a call. In some exemplary implementations, BIGCF 122 may execute ENUM queries for both calling and called number resolution. Additional information regarding ENUM server 146 may be found in co-pending U.S. patent application Ser. No. 11/460,668, filed Jul. 28, 2006, and entitled "ROUTING CALLS IN A NETWORK," which is incorporated by reference herein in its entirety.

The IMS core may include one or more session border controllers (SBCs) that provide control of the boundary between different service provider networks, provide signaling protocol inter-working between the SEP-based INS core and other service provider networks, control the transport boundary between service provider networks, and/or provide usage metering and Quality of Service (QoS) measurements for media flows. Two types of SBCs that may be associated with the IMS core are A-SBC 148 and I-SBC 150. In other implementations, A-SBC 148 and I-SBC 150 may be replaced with border control and border gateway functions.

A-SBC 148 may correspond to an ingress point to the IMS core for Customer Premises Equipment (CPE) traffic. A-SBC 148 may provide SIP aware firewall capabilities that support network address translation (NAT), prevent denial of service (DoS) attacks, and execute other security enforcement features. A-SBC 148 may be the first SIP events normalization point prior to the IMS core.

I-SBC 150 may serve as a connection point between the IMS core and wholesale gateways and also between the IMS core and IP peering VoIP carriers. I-SBC 150 may provide SIP normalization and Topology Hiding and Internetwork Gateway (THIG) services.

System 100 may include a number of policy components. For example, system 100 may, as illustrated in FIG. 1, include policy engine 152, PDF 154, and RM 156 Policy engine 152 may include one or more rule-based engines that govern subscriber access to the IMS core, subscriber access to resources, and routing decisions for several different types of event requests made within the IMS core. In one implementation, policy engine 152 may provide decision logic to policy components (also called "policy decision points") within the IMS core. Policy engine 152 may manage two general categories of resources: 1) network bandwidth resources related to the transport of multimedia content streams; and 2) application resources related to the service logic and media processing used to initiate and control multimedia content streams. Policy engine 152 may maintain real time information regarding the state of all resource requests (e.g., bandwidth requests, media requests, etc.) being made in system 100 and update the appropriate policy components (e.g., PDF 154 and/or RM 156) in system 100 based on the real time information. Moreover, policy engine 152 may allow for policies to be created, modified, and/or deleted and may update the appropriate policy components (e.g., PDF 154 and/or RM 156) in real time to reflect the policy changes. Policy engine 152 may interface with PDF 154 and RM 156 using the extensible markup language (XML) protocol. Policy engine 152 may also interface with one or more external operations support systems (OSSs) (not shown) for policy creation, modification, and/or deletion and with one or more network management systems for obtaining resource status updates. Additional information regarding policy engine 152 may be found in co-pending U.S. patent application Ser. No. 11/460,672, filed Jul. 28, 2006, and entitled "POLICY ENGINE," which is incorporated by reference herein in its entirety.

PDF 154 may provide service-based local policy control. PDF 154 may make policy decisions based on session and media-related information. PDF 154 may exchange this decision information with another IMS element (such as A-SBC 148 or I-SBC 150) to control the flow and characteristics of a communication link. PDF 154 may manage the bandwidth resources. PDF 154 may act as a sub-component of the platform border signaling elements (P-CSCF 106, BIGCF 122, BGCF 120, and SBCs 148 and 150) and may enforce policies to ensure that multimedia streams are transported with the proper bandwidth utilization properties and Quality of Service (QoS) in accordance with subscriber service level agreements (SLAs).

RM 156 may be used to execute a policy at the component level. As illustrated in FIG. 1, RM 156 may be associated with, for example, S-CSCF 102, BGCF 120, BIGCF 122, A-SBC 148, and I-SBC 150. In one implementation, RM 156 may store and execute the policy decisions that are relevant for the location at which RM 156 is associated.

CF 158 may include a unified system for providing both offline charging and online charging. Offline charging is a process where charging information for network resource usage is collected concurrently with that resource usage. The charging information may be passed through a chain of CFs 158. At the end of this process, Charging Detail Record (CDR) files may be generated by the network, which are then transferred to the network operator's billing domain for the purpose of subscriber billing.

Online charging is a process where the actual charging for network resource usage occurs in real time concurrently with that resource use. The charges may be debited from an appropriately funded subscriber account. An example of online charging includes pre-paid calling card usage.

CDF 160 may compile chargeable events gathered from IMS components into a single Charging Detail Record (CDR) for offline billing activities. CDF 160 may gather the chargeable events from a Charging Trigger Function (CTF) that may be associated with components of system 100 and, after creating the CDR, pass the billing data to the CGF 162.

CGF 162 may act as a gateway between both the offline charging system, the online system, and an external post-processing system, such as a billing domain.

GUP 164 may include a collection of data that is stored and managed by different entities, such as the user equipment, the home environment, the visited network, and the value-added service providers, which may affect the way in which an individual user experiences services. GUP 164 may include a number of user profile components, and an individual service may make use of a subset of the available user profile components.

Figure 2:
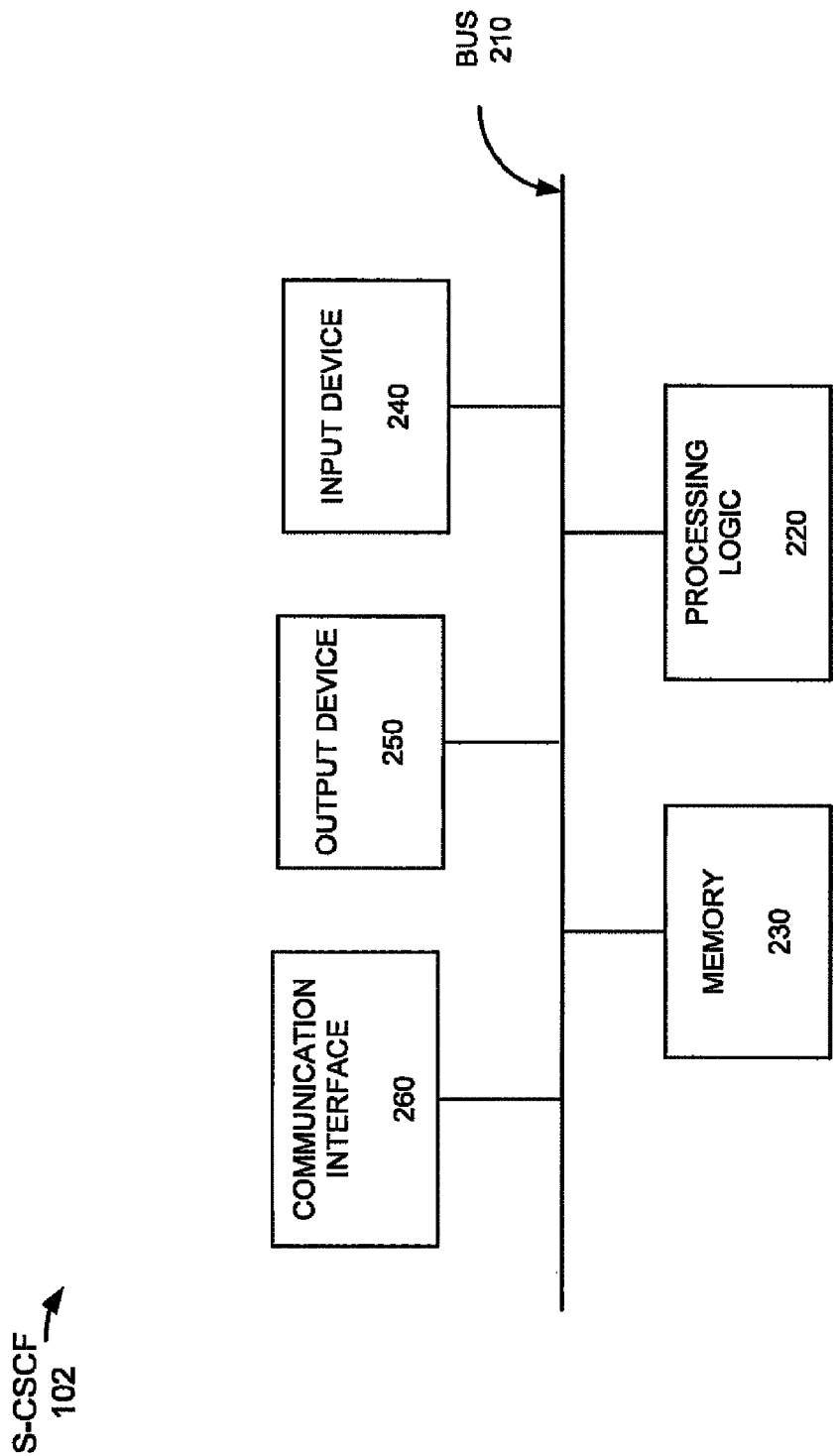
FIG. 2 illustrates an exemplary configuration of the Serving-Call Session Control Function (S-CSCF) or application server of FIG. 1.

FIG. 2 illustrates an exemplary configuration of S-CSCF 102. The application servers, such as CENTREX 136, may be similarly configured. As illustrated, S-CSCF 102 may include a bus 210, processing logic 220, a memory 230, an input device 240, an output device 250, and a communication interface 260. It will be appreciated that S-CSCF 102 may include other components (not shown) that aid in receiving, transmitting, and/or processing data. Moreover, other configurations are possible.

Bus 210 may permit communication among the components of S-CSCF 102. Processing logic 220 may include any type of processor or microprocessor that interprets and executes instructions. In other implementations, processing logic 220 may be implemented as or include an application specific integrated circuit (ASIC), field programmable gate array (FPGA), or the like. Memory 230 may include a random access memory (RAM) or another type of dynamic storage device that stores information and instructions for execution by processing logic 220, a read only memory (ROM) or another type of static storage device that stores static information and instructions for the processing logic 220, and/or some other type of magnetic or optical recording medium and its corresponding drive for storing information and/or instructions.

Input device 240 may include a device that permits an operator to input information to S-CSCF 102, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables S-CSCF 102 to communicate with other devices and/or systems. For example, communication interface 260 may include mechanisms for communicating with other components within system 100.

As will be described in detail below, S-CSCF 102 may perform processing associated with invoking services in an IMS environment. S-CSCF 102 may perform these and other functions in response to processing logic 220 executing software instructions contained in a computer-readable medium, such as memory 230. A computer-readable medium may be defined as one or more memory devices and/or carrier waves. The software instructions may be read into memory 230 from another computer-readable medium or from another device via communication interface 260. The software instructions contained in memory 230 may cause processing logic 220 to perform processes that will be described later. Alternatively, hardwired circuitry may be used in place of or in combination with software instructions to implement processes consistent with the principles of the invention. Thus, systems and methods described herein are not limited to any specific combination of hardware circuitry and software.

Figure 3:
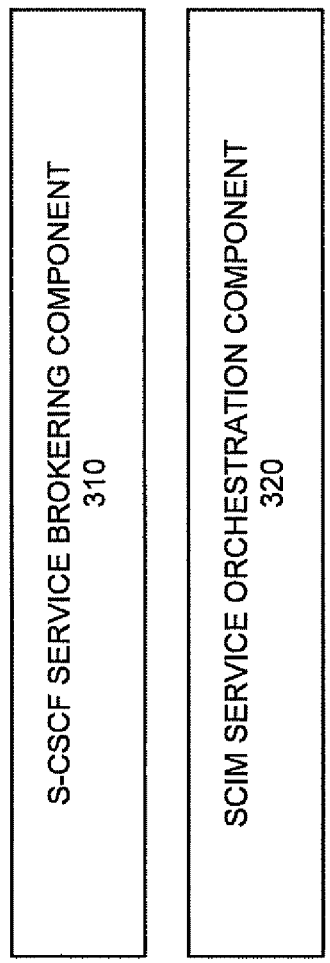
FIG. 3 illustrates an exemplary functional block diagram of a portion of the S-CSCF of FIG. 1.

FIG. 3 illustrates an exemplary functional block diagram of a portion of S-CSCF 102 in an exemplary implementation. As illustrated, S-CSCF 102 may include an S-CSCF service brokering component 310 and a SCIM service orchestration component 320. In other implementations, S-CSCF 102 may include other functional components not illustrated in FIG. 3 that aid in processing call (or session) requests.

S-CSCF service brokering component 310 may receive a message (e.g., a SIP message), parse the message, and apply brokering rules to determine to which application server(s) the message should be sent. The message may include, for example, a SIP INVITE message. S-CSCF service brokering component 310 may parse the message to identify the originating party and terminating party. S-CSCF service brokering component 310 may separately process the service invocation for the calling party and the called party. Depending on the stage of session processing, S-CSCF service brokering component 310 may use the originating party identity to lookup a subscriber profile for the originating party and use the terminating party identity to lookup a subscriber profile for the terminating party. S-CSCF service brokering component 310 may identify the application servers based on brokering rules in the subscriber profile(s).

SCIM service orchestration component 320 may identify one or more micro applications based on a more complex set of brokering rules in the subscriber profile(s). In some implementations, SCIM service orchestration component 320 may also make micro application selections based upon external information, such as information from policy service(s), location services, and/or presence locations, information regarding the readiness condition of an application server (e.g., load balancing information, network outage information, the current state of an application server, resource availability information, etc.), etc.

SCIM service orchestration component 320 may also manage the interaction among micro applications. SCIM service orchestration component 320 may sequence micro application invocations based on predefined priority in the subscriber profile(s). SCIM service orchestration component 320 may detect triggers during an ongoing call and invoke the appropriate micro application(s). SCIM service orchestration component 320 may resolve service conflicts based on predefined interaction rules and may apply default handling in exception cases.

Figure 4:
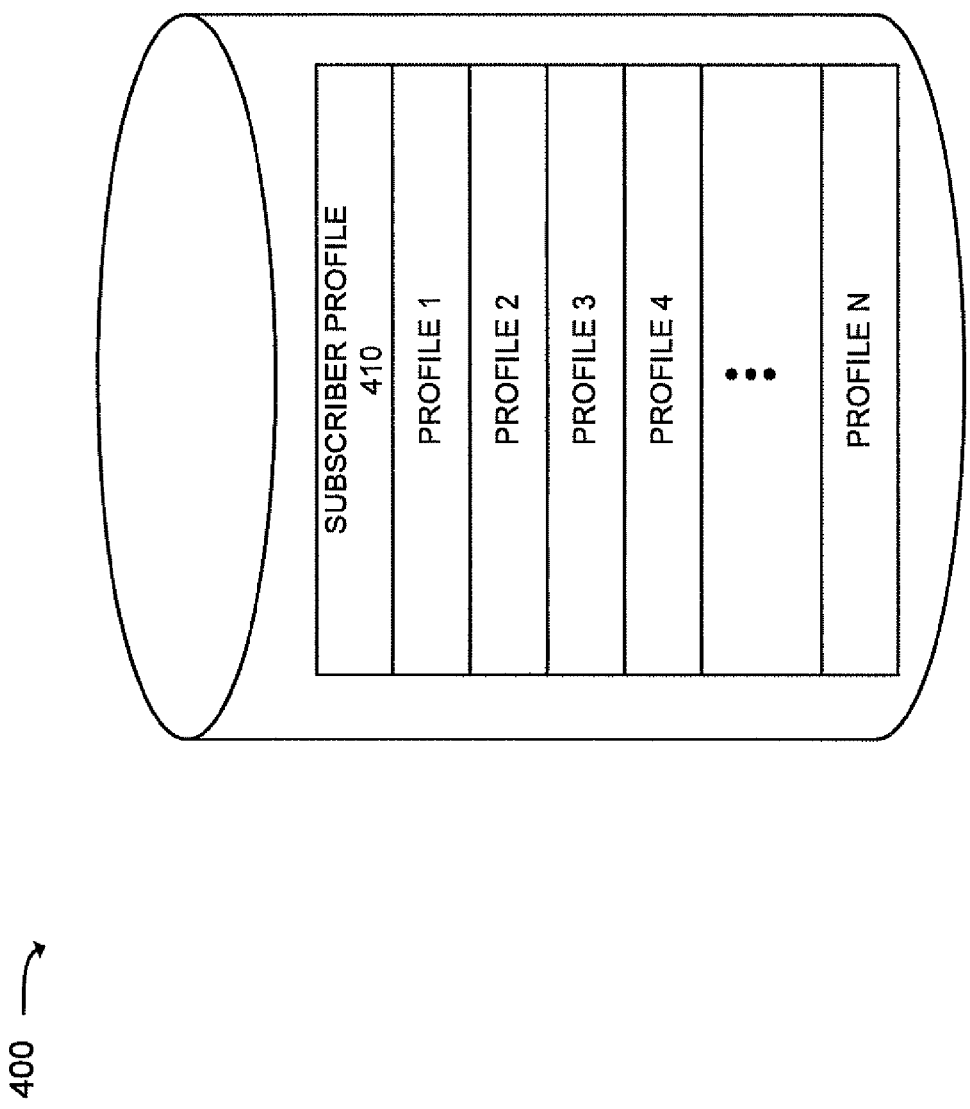
FIG. 4 illustrates an exemplary database that may be associated with the S-CSCF of FIG. 1.

FIG. 4 is a diagram of an exemplary database 400 that may be associated with S-CSCF 102 in an exemplary implementation. While only one database is described below, it will be appreciated that S-CSCF 102 may be associated with additional databases stored locally at S-CSCF 102, such as in memory 230, or distributed throughout system 100.

As illustrated, database 400 may include a subscriber profile field 410. Database 400 may include other fields that facilitate identifying one or more subscriber profiles for a received message.

Subscriber profile field 410 may store profiles for registered subscribers with which the particular S-CSCF 102 is associated. Each subscriber profile may include specific data about the subscriber, such as IMS subscription data to correlate private and public identifiers, the specific S-CSCF 102 where the user is registered, authentication password(s), and a service profile for the subscriber. In other implementations, subscriber profiles may include other information.

In one implementation, the service profile may include filter criteria (also called rules) that may be used to determine the logic to be executed when a particular condition is met and any "services chaining" that may be requested by an originating or terminating party.

The filter criteria may cause application services to be invoked for a session. The filter criteria may include initial filter criteria (iFC) and extended filter criteria. The filter criteria may include zero or one trigger point (TP) and application server information. A trigger point may be a resultant logical operation of one or more service point triggers (SPTs). The initial filter criteria may cause application services to be invoked for initial SIP request messages or events arising during processing of initial REQUEST methods. The extended filter criteria may cause application services to be invoked for additional trigger points that contain SIP response messages returned from the terminating party or events arising during the processing of these SIP response messages. Multiple trigger points might be detected in an incoming request or response message, hence multiple filter criteria might satisfy the triggering condition. Additionally, a single trigger point might have multiple filter criteria associated with it. In order to allow S-CSCF 102/SCIM 103 to handle the multiple filter criteria in the sequence that delivers services in meaningful manner, a priority may be associated with each criterion.

In addition, a third type of filter criteria—the subsequent filter criteria (sFC)—may be signaled from the SIP AS to the S-CSCF. sFC may allow for dynamic definition of the relevant SPTs at application execution time. As such, the sFC might override the rest of the service invocation sequence in the current active session in the following ways: 1) insert a filter criterion as the next highest priority, 2) suppress/resume one or more filter criteria, 3) cancel the rest unexecuted filter criteria. Consequently, if S-CSCF 102/SCIM 103 receives a subsequent filter criterion as result of an application execution, the remaining not-yet executed filter criteria may be temporarily re-prioritized, temporarily inactivated and resumed in a follow up sFC, or revoked as per instructions in the sFC. The life of an sFC spans from the time it arrives at S-CSCF 102/SCIM 103 until the time the corresponding session ends. After the end of the session, the filter criteria in the subscriber's service profile may return to the state as provisioned.

SPTs may include those instances in the SIP signaling as well as non-SIP signaling events on which filter criteria can be set. SPTs, which may be part of initial trigger points for initial filter criteria, may include headers and contents of SIP request messages. The initial triggers may include, for example, SPTs relating to the Request Uniform Resource Identifier (URI); any initial known or unknown request method type (e.g., INVITE, REGISTER, BYE, ACK, OPTIONS, CANCEL, INFO, SUBSCRIBE, NOTIFY, UPDATE, MESSAGE, REFER, PRACK, COMET, PUBLISH, etc.); the presence or absence of a header field; the registration type (e.g., whether a REGISTER request is an initial request, re-registration request, or a de-registration request); content of any known or unknown header field; direction of the request with respect to the served user (e.g., originating or terminating); session description protocol information; etc.

SPTs, which may be part of additional trigger points for extended filter criteria, may include headers and contents of SIP response messages that may cause service invocation after the initial request. These SPTs may include additional SIP signaling instances relating to portions of a response message from the terminating party. For example, SPTs may include instances relating to the response message type (e.g., 1XX, 2XX, 3XX, 4XX, 5XX, 6XX, etc.); the presence or absence of any known or unknown headers in the response message; the content of any known or unknown header field in the response message; content of any session description protocol (SDP) field within the body of the response message; the content of the message body of the response message; one or more reference filter criteria (FC) identifiers (IDs); etc. The response code used as a SPT may be properly attributed so that the response message corresponding to the SPT may either be passed along to the originator or suppressed according to the value defined in this SPT attribute. In some implementations, a trigger to a particular filter criterion may relate to the status of other filter criteria-referred to as the "reference filter criteria" as described above. This relationship may be "dependent" or "conflict." For example, if service-B is said to be dependent on service-A, this means that the invocation of service-A is a condition to be met in order to invoke service-B. If service-B is said to be a conflict to service-A, this means that the invocation of service-A may preclude the invocation of service-B. A trigger point may include this relationship as part of the logical operation with other SPTs. For example, a trigger point may indicate that if a particular filter criterion (which may be identified by an FC identifier) has been satisfied and already executed for an initial SIP request message, and a response from the terminating party includes particular information (e.g., a busy code "486"), then a specified application service should be invoked. SPTs may also include instances relating to definable non-SIP signaling trigger events. The additional triggers may be monitored when services are armed corresponding to the reference FC. For example, a filter criterion may include a trigger event based on a timer. The definable trigger event may be defined, in one exemplary implementation, using the following format:

> Trigger Name
> Reference FC
>   Id
>   Invocation Status
> Value
>   Format
>   Domain
> Setting
>   Unit
>   Value.

As an example, a user may define the following timer-based trigger event:

Trigger Name: Time-Expired

Reference FC: Id [Numeric], Status [Armed, not-Armed]

Value: Boolean, [True|False]

Setting: Unit [Second], Value [Numeric].

Several SPTs may be combined in a single trigger point via a Boolean operator, such as an OR, an AND, or a NOT operator. As an example, the SPT could identify a SIP method "INVITE," and a string (7325551212) in the "RURI" or "From" field of the message. The TP may use the "AND" operation to combine these two together. The result may look like-TP: "Method=IN E" AND ("String=7325551212 IN RURI").

Table 1 below illustrates exemplary filter criteria that may be included in a subscriber profile. As illustrated, the filter criteria may include the filter criterion (FC) identification (ID) field, the public user identification (ID) field, the priority field, the trigger point field, and an application server identification field. The subscriber profile may include additional and/or other fields than illustrated in Table 1. The FC identification field may identify either the initial filter criteria or extended filter criteria with which the trigger point in the trigger point field is associated. The public user identifier field may store information that uniquely identifies a user of the IMS. The priority field may include information identifying a priority associated with an entry of filter criteria. The trigger point field may store a trigger point associated with the user identified in the public user identification field. The application server identification field may store information identifying an application server from which an application service is to be invoked.

TABLE 1

| FC ID | Public User ID | Priority | Trigger Point | Application Server ID |
|---|---|---|---|---|
| 11 | 7325551212 | 1 | RURI=7325551212@verizon.com AND SessionCase="Origination" AND method="REGISTER" | CF@verizon.com |
| 12 | 7325551212 | 2 | RURI=7325551212@verizon.com AND SessionCase="Origination" AND method="REGISTER" | VM@verizon.com |
| 13 | 7325551212 | 3 | RURI=7325551212@verizon.com AND "Time-of-Date=false" AND SessionCase="Termination" AND method="INVITE" | VM@verizon.com |
| 14 | 7325551212 | 4 | RURI=7325551212@verizon.com AND "Time-of-Date=false" AND SessionCase="Termination" AND method="INVITE" | CF@verizon.com |
| 15 | 7325551212 | 5 | Ref_FC_Id=14 AND Status="Armed" Response-Code="486" | VM@verizon.com |

TABLE 1-continued

| FC ID | Public User ID | Priority | Trigger Point | Application Server ID |
|---|---|---|---|---|
| 16 | 7325551212 | 6 | AND To=7325551212@verizon.com AND SessionCase="Termination" AND Ref_FC_Id=14 AND Status="Armed" AND SessionCase="Termination" AND setting=16 AND time-expired="true" | VM@verizon.com |

As an example service case, assume a subscriber has both call forwarding service and voice mail service. The subscriber service profile may contain:

An initial filter criterion (11) that invokes $3^{rd}$ party registration to the CF application;

An initial filter criterion (12) that invokes $3^{rd}$ party registration to the voicemail (VM) application;

An initial filter criterion (13) that invokes the VM service if the session arrives out of the preconfigured time of date;

An initial filter criterion (14) that invokes the call forwarding service if a session arrives within the time of date;

An extended filter criterion (15) that invokes the voicemail service if the call forwarding is executed and called party is busy; and An extended filter criterion (16) that invokes the voicemail service if the call forwarding is executed and called party does not answer (e.g., ring-no-answer).

At the time the call forwarding service is invoked and executed, the call forwarding application may send a sFC to S-CSCF 102/SCIM 103 indicating to suppress the rest of unexecuted filter criteria. This action temporarily deactivates the extended filter criteria 15 and 16 that in the event a "486-busy" occurs, S-CSCF 102/SCIM 103 does not invoke the VM service and instead, passes the busy message back to the call forwarding application. S-CSCF 102/SCIM 103 may also not activate the filter criterion 16 and if the called party is ring-no-answer, then the CF application will be able to detect the RNA situation. The call forwarding service may then repeat the same signaling procedure to reach the alternative number as the subscriber had programmed. If this alternative number is the last number in the subscriber's service configuration, the call forwarding application may include another sFC to resume the rest of filter criteria (15 and 16). At this time, if the terminating party returns a "486-busy" response, S-CSCF 102/SCIM 103 may arm the extended filter criterion (16) that invokes the VM application. In some situations, the "486" response code used as the SPT may be attributed as "suppress." Therefore, S-CSCF 102/SCIM 103 may not pass the 486 response back to the originating party while being connected to the called party's voicemail.

Figure 5:
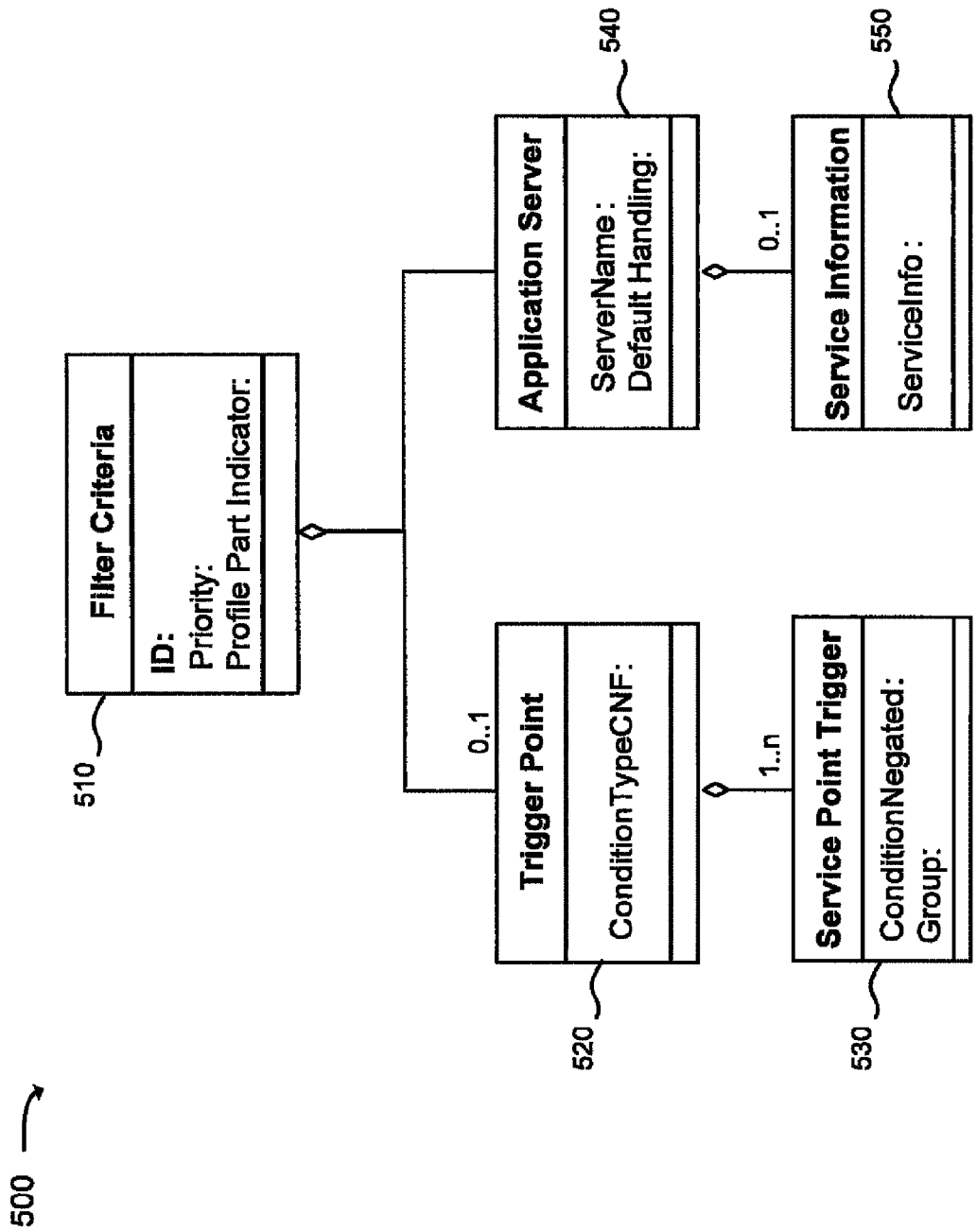
FIG. 5 illustrates an exemplary structure of filter criteria in an exemplary implementation.

FIG. 5 illustrates an exemplary structure of a filter criterion 510. Other configurations are possible. A filter criterion 510 may include zero or one instance of a trigger point class 520 and one instance of an Application Server class 540. The filter criterion 510 may be associated with an identification (ID) attribute, a priority attribute, and a profile part indicator attribute. The identification attribute may uniquely identify the filter criterion. The priority attribute may indicate the priority with which the filter criterion is associated. The profile part indicator attribute may be an enumerated type, with possible values of "REGISTERED" and "UNREGISTERED," indicating whether the filter criterion is a part of a registered or an unregistered user profile. If the profile part indicator attribute is not associated with a filter criterion, the filter criterion may be considered to be relevant to both registered and unregistered user profiles.

Trigger Point class 520 describes the trigger points that should be checked in order to find out whether or not the indicated Application Server should be contacted. As indicated above, each Trigger Point may be provided as a Boolean expression. The absence of a Trigger Point instance 520 may indicate an unconditional triggering of the identified application server. The ConditionTypeCNF attribute may define how the set of SPTs are expressed, (e.g., an ORed set of ANDed sets of SPT statements, an ANDed set of ORed sets of statements, etc.). Each Trigger Point may include 1 to n Service Point Triggers 530, where n is an integer greater than 1. The Condition Negated attribute may allow individual SPT indicator statements to be negated. The Group attribute may identify ANDed or ORed sets of SPTs.

Application server class 540 may define the application server, which is contacted, if the trigger points are met. The server name attribute may identify the SIP URL of the application server to contact. The default handling attribute may determine whether the dialog should be released if the application server could not be reached. Application server class 540 may be associated with zero or one Service Information class 550. Service Information class may allow information to be downloaded to S-CSCF 102 that is to be transferred transparently to an application server when the trigger points of a filter criterion are satisfied. The Service Information attribute includes a string conveying that information.

Figure 6:
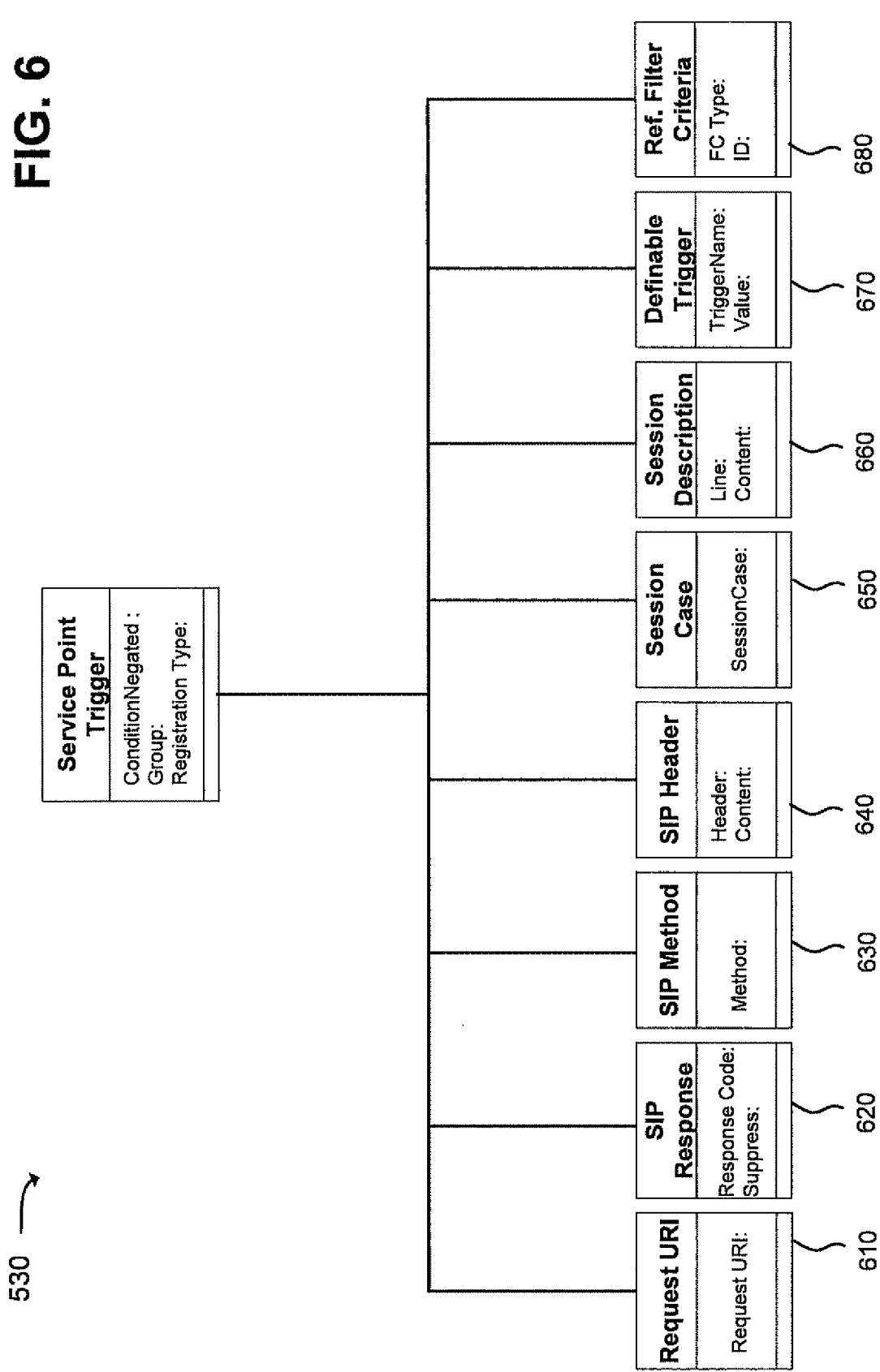
FIG. 6 illustrates an exemplary structure of a service trigger point in an exemplary implementation.

FIG. 6 illustrates an exemplary structure of a service point trigger 530. Other configurations are possible. Each SPT 530 may include a Request-URI trigger 610, a SIP response trigger 620, a SIP method trigger 630, a SIP header trigger 640, a session case trigger 650, a session description trigger 660, etc. Each SPT 530 may also include one or more definable triggers 670 and a reference filter criteria identifier 680. SPT 530 may include other triggers.

Request-URI 610 may define a SPT relating to portions of the Request-URI from an originating party. SIP Response 620 may define, as described above, a SPT relating to portions of a response message from the terminating party. SIP Response 620 may include an attribute identifying the response code and whether or not the response from the terminating party should be suppressed. SIP Method 630 may define a SPT for any known or unknown request method type (e.g., INVITE, REGISTER, BYE, ACK, OPTIONS, CANCEL, NO, SUBSCRIBE, NOTIFY, UPDATE, MESSAGE, REFER, PRACK, COMET, PUBLISH, etc.). SIP Header 640 may define a SPT for the presence or absence of any SIP header or for the content of any SIP header. SIP Header 640 may include a header attribute that identifies the SIP header and a content attribute that defines the value of the SIP header, if needed. Session Case 650 may represent an enumerated type, with, for example, possible values "Originating," "Terminating_Registered," and "Terminating_Unregistered" indicating whether the filter should be used by the S-CSCF/SCIM handling the originating or terminating for a registered end user or terminating for an unregistered end user. Session Description 660 may define a SPT for the content of any SDP field within the body of a SIP Method. Session Description 660 may include a line attribute that identifies the line inside the session description and a content attribute that defines the content of the line identified by the line attribute. Definable trigger 670 may, as indicated above, define a SPT relating to a definable non-SIP signaling trigger event. Definable trigger 670 may include, for example, a trigger name attribute that identifies the definable trigger and a value that indicates whether the trigger has been met. Reference Filter Criteria 680 may identify a filter criterion on which SPT 530 depends. Reference Filter Criteria 680 may include a filter criteria type attribute that defines the type of filter criterion on which SPT 530 depends and an identification attribute that uniquely identifies the filter criterion.

FIG. 7 is a diagram of an exemplary database 700 that may be associated with an application server, such as CENTREX 136, in an exemplary implementation. While only one database is described below, it will be appreciated that an application server may be associated with additional databases stored locally at the application server, such as in memory 230, or distributed throughout system 100.

Database 700 may temporarily store subsequent filter criteria until the session ends. The subsequent filter criteria may include filter criteria that may be satisfied based on a result of run-time execution sent from the application server to S-CSCF 102/SCIM 103. The subsequent filter criteria may allow for dynamic definition of SPTs at application execution time. In one exemplary implementation, the subsequent filter criteria may be stored in the appropriate application server as part of the subscriber data and sent to S-CSCF 102/SCIM 103 as a result of service execution by the application server. The subsequent filter criteria may be sent from the application server to S-CSCF 102/SCIM 103 via, for example, a SIP message (e.g., INVITE, NOTIFY, INFO, etc.) in the header portion of the SIP message or the body portion of the SIP message.

As illustrated, database 700 may include a public user identification (ID) field 710, a priority field 720, a trigger point field 730, and an application server identification field 740. Database 700 may include additional and/or other fields than illustrated in FIG. 7. For example, database 700 may also include an application type field that identifies the type of application service to be invoked.

Public user identifier field 710 may store information that uniquely identifies a user of the IMS. Priority field 720 may include information identifying a priority associated with a particular subsequent filter criteria entry. Trigger point field 730 may store a trigger point for the user identified in the public user identification field. Application server identification field 740 may store information identifying an application server from which an application service is to be invoked.

Figure 8:
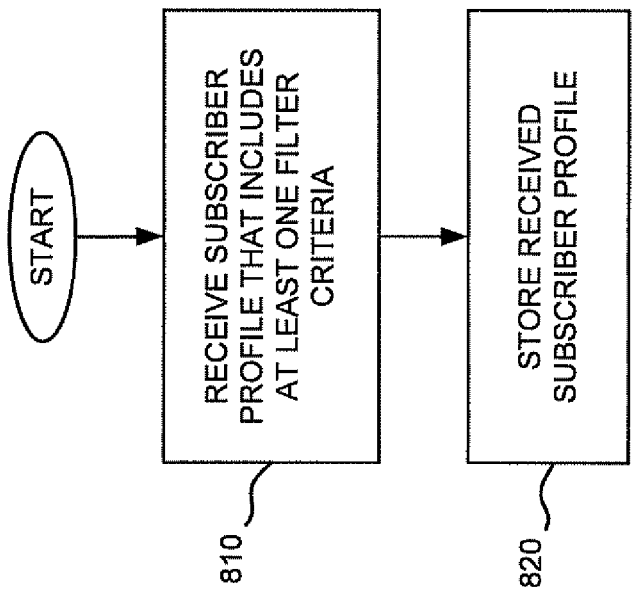
FIG. 8 illustrates an exemplary flow chart for storing a subscriber profile consistent with an exemplary implementation.

FIG. 8 is a flowchart of an exemplary process for storing subscriber profiles in an exemplary implementation. The processing described in FIG. 8 may be implemented by S-CSCF 102. Processing may begin with S-CSCF 102 receiving a subscriber profile (block 810). S-CSCF 102 may receive the subscriber profile automatically or in response to an action by S-CSCF 102 (e.g., in response to a request from S-CSCF 102 for the subscriber profile). S-CSCF 102 may, for example, receive the subscriber profile when a subscriber registers with the IMS. S-CSCF 102 may alternatively request the subscriber profile when a call request is received (e.g., in those situations when the IMS user is unregistered).

The subscriber profile may include the information described above with respect to FIG. 4. In one implementation, the subscriber profile may include filter criteria for invoking one or more application services prior to and/or after a session has been established between an originating party and a terminating party.

S-CSCF 102 may store the received subscriber profile (block 820). For example, S-CSCF 102 may store the subscriber profile in database 400 (FIG. 4).

FIGS. 9A and 9B are a flowchart of an exemplary call handling process in an exemplary implementation. The processing described in FIG. 9 may be performed by S-CSCF 102/SCIM 103. Processing may begin with S-CSCF 102 receiving a call (or session) request (block 905, FIG. 9A). The call request may include, for example, a SIP request, such as a SIP INVITE request. S-CSCF 102 may receive the call request from another device in the IMS, such as P-CSCF 106.

S-CSCF 102 may parse the received call request (block 910). For example, S-CSCF 102 may parse the call request to identify information in the header of the request and/or body of the request. In one implementation, S-CSCF 102 may identify the originating party for the call request (block 915). S-CSCF 102 may use the originating party's identity to obtain a subscriber profile associated with the originating party's identity (block 920). The subscriber profile may include initial filter criteria, extended filter criteria, and may also, at session execution time, include subsequent filter criteria.

S-CSCF 102/SCIM 103 may invoke one or more application services for the call request based on the initial filter criteria stored in the originating party's subscriber profile (block 925). As set forth above, the subscriber profile may include initial filter criteria that may be used to determine the service(s) to be invoked for the originating party. S-CSCF 102/SCIM 103 may use the initial filter criteria against the public user identity that was used to place the call request (i.e., the originating party's identity) to check the existence of trigger points in the call request that match unexecuted initial filter criteria in the context of this call request. S-CSCF 102/SCIM 103 may analyze the trigger points starting from the highest priority trigger point. S-CSCF 102/SCIM 103 may invoke the application service that is associated with the highest priority trigger point. Once invoked, S-CSCF 102/SCIM 103 may invoke the next highest priority application service and so on until all applicable application services have been invoked (block 927).

S-CSCF 102 may also parse the call request to identify the terminating party for the call request (block 930, FIG. 9B). S-CSCF 102 may use the terminating party's identity to obtain a subscriber profile associated with the terminating party's identity (block 935). If the terminating party is a registered subscriber, S-CSCF 102 may use the terminating party's identity to obtain a subscriber profile from database 400. If the terminating party is an unregistered user, S-CSCF 102 may use the terminating party's identity to obtain a subscriber profile from HSS 108. Alternatively, S-CSCF 102 may route the call request to another S-CSCF that is served by the terminating party. The subscriber profile may include initial filter criteria, extended filter criteria, and may also, at session execution time, include subsequent filter criteria.

S-CSCF 102/SCIM 103 may invoke one or more application services for the call request based on the initial filter criteria stored in the terminating party's subscriber profile (block 940). As set forth above, the subscriber profile may include initial filter criteria that may be used to determine the service(s) to be invoked for the terminating party. S-CSCF 102/SCIM 103 may use the initial filter criteria against the public user identity to which the call request is destined (i.e., the terminating party's identity) to check the existence of trigger points in the call request that match unexecuted initial filter criteria in the context of this call request. S-CSCF 102/SCIM 103 may analyze the trigger points starting from the highest priority trigger point. S-CSCF 102/SCIM 103 may invoke the application service that is associated with the highest priority trigger point. Once invoked, S-CSCF 102/SCIM 103 may invoke the next highest priority application service and so on until all applicable application services have been invoked (block 943).

S-CSCF 102/SCIM 103 may determine whether additional filter criteria have been specified by the originating party's subscriber profile or the terminating party's subscriber profile (block 945). As indicated above, a subscriber profile may include additional trigger points (e.g., relating to extended filter criteria) for events occurring after the call request has been processed by S-CSCF 102/SCIM 103. The events may relate to a response from the terminating party and/or other user-defined events that occur during the ongoing session. S-CSCF 102/SCIM 103 may determine whether the additional filter criteria have been suppressed by a subsequent filter criterion sent by an application server (block 947). As will be described in further detail below with respect to FIG. 11, S-CSCF 102/SCIM 103 may receive a subsequent filter criterion, which may affect the execution of additional filter criteria specified by the originating party and/or terminating party.

If additional trigger points have been specified by the originating party and/or terminating party (block 945—YES) and the additional trigger points are not suppressed (block 947—NO), S-CSCF 102/SCIM 103 may begin monitoring traffic from the originating party and/or terminating party and/or begin monitoring a mechanism based on the additional trigger points (block 950). For example, if the additional trigger points relates to a response from the terminating party, S-CSCF 102/SCIM 103 may monitor the response message from the terminating party. As another example, if the additional trigger points relates to a definable event (e.g., a timer-based event), S-CSCF 102/SCIM 103 may set a monitoring mechanism (e.g., a timer) specified by the additional trigger point and may monitor the mechanism to determine when the event occurs.

Once S-CSCF 102 has begun monitoring based on the additional trigger point (block 950), S-CSCF 102/SCIN 103 has determined that no additional trigger points have been specified by the originating party or terminating party (block 945—NO), or any additional filter criteria that have been specified by the originating party or terminating party have been suppressed by an sFC sent by an application server (block 947—YES), S-CSCF 102 may forward the call request toward the appropriate destination (e.g., the terminating party) (block 955). For example, S-CSCF 102 may forward the call request to P-CSCF 106, BGCF 120, or I-SBC 150 for completing the call.

Figure 10:
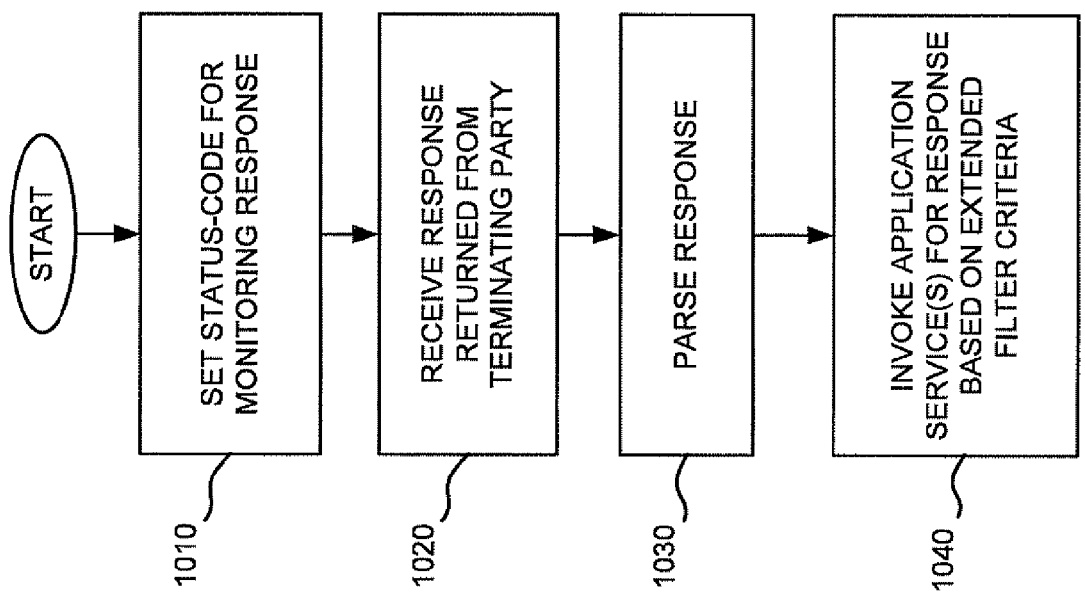
FIG. 10 illustrates an exemplary flow chart for invoking application services based on additional filter criteria in an exemplary implementation.

FIG. 10 illustrates an exemplary flow chart for invoking application services based on additional trigger points. In this exemplary flow chart, assume that the originating party's subscriber profile includes one or more trigger points relating to a response message from the terminating party that is returned in response to a call request from the originating party. The processing described below may also be applied to any trigger point included in the terminating party's subscriber profile that relates to the response message.

Processing may begin with S-CSCF 102/SCIM 103 setting the status-code for monitoring a response message from the terminating party when an iFC has been armed (i.e., when the iFC has been satisfied) (block 1010). As indicated above, additional trigger points may include dependency from one or more iFCs (e.g., see the last two entries in Table 1 above), When a subscriber profile includes an additional trigger point relating to a response message that depends from a particular iFC, S-CSCF 102/SCIM 103 may monitor the response message from the terminating party when the particular iFC has been armed (or satisfied).

S-CSCF 102/SCIM 103 may receive the response message from the terminating party (block 1020). S-CSCF 102/SCIM 103 may parse the received response message (block 1030). For example, S-CSCF 102/SCIM 103 may parse the response message to identify portions of the header and/or body of the response message. For example, if originating party's subscriber profile includes a trigger point relating to the presence or absence of a particular header field in the response message, S-CSCF 102/SCIM 103 may parse the response message to determine whether the header field is present or absent S-CSCF 102/SCIM 103 may invoke one or more application services for the response message based on the trigger point(s) in the extended filter criteria stored in the originating party's subscriber profile (block 1040). If multiple trigger points apply to the response message, S-CSCF 102/SCIM 103 may analyze the trigger points starting from the highest priority trigger point. S-CSCF 102/SCM 103 may invoke the application service associated with the highest priority trigger point. Once invoked, S-CSCF 102/SCIM 103 may invoke the next highest priority application service and so on until all applicable application services have been invoked for the response message.

Figure 11:
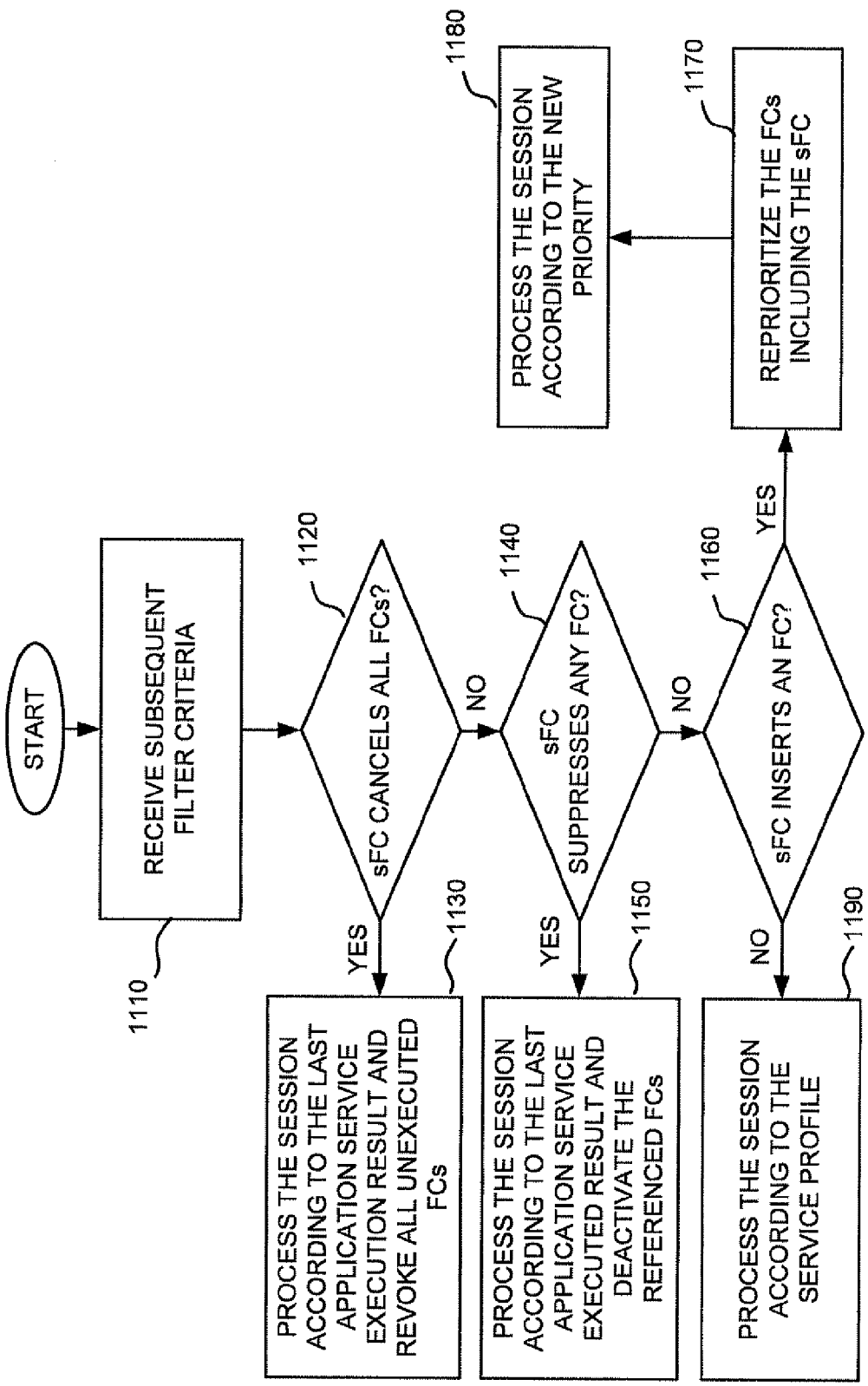
FIG. 11 illustrates an exemplary flow chart for invoking application services based on subsequent filter criteria in an exemplary implementation.

FIG. 11 illustrates an exemplary flow chart for invoking application services based on subsequent filter criteria in an exemplary implementation. As described above with respect to FIG. 7, S-CSCF 102/SCIM 103 may receive subsequent filter criteria for an originating party and/or a terminating party from an application server.

Processing may begin with S-CSCF 102/SCIM 103 receiving subsequent filter criteria (block 1110). The subsequent filter criteria may be received in response to an application service being invoked on the application server. In one implementation, the application server may send the subsequent filter criteria to S-CSCF 102/SCM 103 via a SIP message, such as an INVITE message, a NOTIFY message, an INFO message, etc. The subsequent filter criteria may be stored in the header and/or the body of the SIP message.

S-CSCF 102/SCIM 103 may process the message from the application service that contains the subsequent filter criteria in a number of ways. For example, S-CSCF 102/SCIM 103 may determine whether the subsequent filter criteria cancels all of the unexecuted filter criteria (block 1120). If so (block 1120—YES), S-CSCF 102/SCIM 103 may process the session according to the result of the last executed application service (i.e., the application server sends the subsequent filter criteria, which causes S-CSCF 102/SCIM 103 to revoke all the rest of the filter criteria) (block 1130). S-CSCF 102/SCIM 103 may determine whether the subsequent filter criteria suppresses one or more unexecuted filter criterion in the service profile (block 1140). If so (block 1140—YES), S-CSCF 102/SCIM 103 may process the session according to the result of the last executed application service (i.e., the application server sends the subsequent filter criteria, which causes S-CSCF 102/SCIM 103 to temporarily deactivate the referenced filter criteria according to the subsequent filter criteria (block 1150). S-CSCF 102/SCIM 103 may determine if the subsequent filter criteria indicates that one or more filter criteria should be inserted in the list of unprocessed filter criteria (block 1160). In some situations, the subsequent filter criteria may specify where the one or more filter criteria are to be inserted (e.g., the one or more filter criteria may be associated with the default next highest priority). If the subsequent filter criteria identify one or more filter criteria to be inserted, S-CSCF 102/SCIM 103 may add the one or more filter criteria to the rest of unprocessed filter criteria and recalculate the combined filter criteria, including the one or more filter criteria sent from the application server (block 1170). S-CSCF 102/SCIM 103 may process the session according to the new priority ordering of the filter criteria (block 1180). For example, S-CSCF 102/SCIM 103 may, based on the recalculated priority values, automatically process the subsequent filter criteria by invoking the appropriate application service(s) and then resume processing the unprocessed filter criteria. As another example, S-CSCF 102/SCIM 103 may automatically process the subsequent filter criteria by invoking the appropriate application service(s) and canceling the processing of any unprocessed filter criteria. If the subsequent filter criteria identifies one or more filter criteria to be inserted (block 1160—NO), S-CSCF 102/SCIM 103 may process the session according to the result of the last application service execution and process the session according to the rest of executed filter criteria pre-set service profile (block 1190).

Implementations described herein relate to providing filter criteria for invoking application services in an IMS.

The foregoing description of exemplary implementations provides illustration and description, but is not intended to be exhaustive or to limit the invention to the precise form disclosed. Modifications and variations are possible in light of the above teachings or may be acquired from practice of the invention. For example, while series of acts have been described with respect to FIGS. 6-10, the order of the acts may be varied in other implementations. Moreover, non-dependent acts may be implemented in parallel.

Embodiments of the invention, as described above, may be implemented in many different forms of software, firmware, and hardware. The actual software code or specialized control hardware used to implement embodiments of the invention is not limiting of the invention. Thus, the operation and behavior of embodiments were described without reference to the specific software code-it being understood that design software and control hardware may be designed to implement embodiments based on the description herein.

Further, certain portions of the invention may be implemented as "logic" that performs one or more functions. This logic may include hardware, such as an application specific integrated circuit, a field programmable gate array, a processors or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
   an Internet Protocol Multimedia Subsystem (IMS) device to:
   analyze a portion of a response to a call request based on a trigger point included in a subscriber profile associated with an originating device,
   the response being received from a terminating device,
   the call request being sent by the originating device to the terminating device; invoke, based on analyzing the portion of the response, an application service, receive, based on invoking the application service, a filter criterion, and suppress, based on the filter criterion, an unexecuted trigger point in the subscriber profile associated with the originating device.

2. The system of claim 1, where the IMS device is further to:
   set, prior to receiving the response, the trigger point, where the trigger point includes at least one trigger relating to the analyzed portion of the response.

3. The system of claim 1, where the IMS device is further to:
   receive, based on invoking the application service, a returned message from an application server, and
   invoke, based on receiving the returned message, one or more additional services.

4. The system of claim 1, where the IMS device is further to:
   receive another filter criterion, and
   execute, based on receiving the other filter criterion, the suppressed unexecuted trigger point.

5. The system of claim 1, where the IMS device receives the filter criterion from an application server associated with the application service based on the application server executing the application service.

6. The system of claim 1, where the subscriber profile associated with the originating device includes a plurality of trigger points, where the plurality of trigger points includes the trigger point and the unexecuted trigger point, and where at least one of the plurality of trigger points relates to at least one of: a type of the response, a presence or an absence of a known header field in the response, or a presence or an absence of an unknown header field in the response.

7. The system of claim 1, where the subscriber profile associated with the originating device includes a plurality of trigger points, where the plurality of trigger points includes the trigger point and the unexecuted trigger point, and where at least one of the plurality of trigger points relates to at least one of: a content of a known header field in the response, a content of an unknown header field in the response, a content of a session description protocol field in the response, or a content of a message body of the response.

8. The system of claim 1, where the subscriber profile associated with the originating device includes a plurality of trigger points, where the plurality of trigger points includes the trigger point and the unexecuted trigger point, and where at least one of the plurality of trigger points relates to a timer-based event.

9. A method comprising:
   receiving, at an Internet Protocol Multimedia Subsystem (IMS) device, a call request from an originating device;
   forwarding, via the IMS device, the call request to a terminating device;
   receiving, at the IMS device, a response message based on the call request, the response message being received from the terminating device and the response message being for the originating device;
   receiving, prior to invoking one or more application services and from an application server, a filter criterion;
   altering, based on the filter criterion, an execution of one or more unexecuted trigger points included in a subscriber profile associated with the originating device; and
   invoking, via the IMS device, the one or more application services, specified in the subscriber profile associated with the originating device, based on altering the execution of the one or more unexecuted trigger points.

10. The method of claim 9, further comprising:
analyzing, based on a trigger point included in the subscriber profile that is associated with the originating device, a portion of the response message; and
where the one or more application services are invoked based on analyzing the portion of the response message.

11. The method of claim 10, further comprising:
arming, based on receiving the call request, an initial filter criterion;
setting, prior to receiving the response message and based on the initial filter criterion being armed, the trigger point, where the trigger point includes at least one trigger relating to a portion of the response message; and
where the one or more application services are invoked based on the at least one trigger.

12. The method of claim 9, further comprising:
receiving, at the IMS device, a returned message from an application server associated with one of the one or more application services; and
invoking, based on receiving the returned message, one or more additional application services.

13. The method of claim 9, further comprising:
suppressing, based on the subscriber profile associated with the originating device, the response message.

14. The method of claim 9, further comprising:
forwarding, based on the subscriber profile associated with the originating device, the response message to the originating device.

15. A non-transitory computer-readable medium storing instructions, the instructions comprising: one or more instructions that, when executed by a processor of an Internet Protocol Multimedia Subsystem (IMS) device, cause the processor to:
receive a call request from an originating device;
forward the call request to a terminating device;
receive a response message based on the call request, the response message being received from the terminating device and being intended for the originating device;
receive, prior to invoking one or more application services and from an application server, a filter criterion;
alter, based on the filter criterion, an execution of one or more unexecuted trigger points included in a subscriber profile associated with the originating device; and
invoke the one or more application services, specified in the subscriber profile associated with the originating device, based on altering the execution of the one or more unexecuted trigger points.

16. The non-transitory computer-readable medium of claim 15, where the instructions further comprise: one or more instructions to analyze, based on a trigger point included in the subscriber profile associated with the originating device, a portion of the response message; and where the one or more application services are invoked based on analyzing the portion of the response message.

17. The non-transitory computer-readable medium of claim 16, where the instructions further comprise: one or more instructions to arm, based on receiving the call request, an initial filter criterion; one or more instructions to set, prior to receiving the response message and based on the initial filter criterion being armed, the trigger point, where the trigger point includes at least one trigger relating to a portion of the response message; and where the one or more application services are invoked based on the at least one trigger.

18. The non-transitory computer-readable medium of claim 15, where the instructions further comprise: one or more instructions to receive a returned message from an application server associated with one of the one or more application services; and one or more instructions to invoke, based on receiving the returned message, one or more additional application services.

19. The non-transitory computer-readable medium of claim 15, where the instructions further comprise: one or more instructions to suppress, based on the subscriber profile associated with the originating device, the response message.

20. The non-transitory computer-readable medium of claim 15, further comprising: one or more instructions to forward, based on the subscriber profile associated with the originating device, the response message to the originating device.

* * * * *